United States Patent
Huang

(10) Patent No.: US 7,693,505 B2
(45) Date of Patent: Apr. 6, 2010

(54) SIGNAL DETECTOR

(76) Inventor: Dennis Huang, 1 Fl., No. 1, Lane 9, Ningpo E. St., Taipei (TW)

( * ) Notice: Subject to any disclaimer, the term of this patent is extended or adjusted under 35 U.S.C. 154(b) by 606 days.

(21) Appl. No.: 11/218,582

(22) Filed: Sep. 6, 2005

(65) Prior Publication Data

US 2006/0258320 A1    Nov. 16, 2006

(30) Foreign Application Priority Data

May 13, 2005    (TW) .............................. 94207782 U

(51) Int. Cl.
*H04B 1/06*    (2006.01)
(52) U.S. Cl. .................. 455/344; 455/90.1; 455/318
(58) Field of Classification Search .................. 455/334
See application file for complete search history.

(56) References Cited

U.S. PATENT DOCUMENTS

| | | | |
|---|---|---|---|
| 6,091,442 A * | 7/2000 | Lee | 348/28 |
| 6,385,261 B1 * | 5/2002 | Tsuji et al. | 375/346 |
| 2006/0030277 A1 * | 2/2006 | Cyr et al. | 455/77 |
| 2006/0148423 A1 * | 7/2006 | Sharpe | 455/90.1 |
| 2007/0243847 A1 * | 10/2007 | Shen | 455/318 |

* cited by examiner

*Primary Examiner*—Duc Nguyen
*Assistant Examiner*—Ajibola Akinyemi
(74) *Attorney, Agent, or Firm*—Bacon & Thomas, PLLC

(57) ABSTRACT

The present invention relates to a signal detector, which discerns the presence of signals in a circumscribed area, and a warning is given if a signal is detected. The signal detector adjusts its conditions for the background noise elimination depending on the detected environments in order to discern the presence of signals more efficiently and correctly. Moreover, the present invention shows on a display device the protocol of the detected signal, and enables the user to know the type of the detected signal. Besides, the user can also choose to control the signal detector in a wired or wireless way through the signal connection port, and the user can manually adjust detecting conditions to its environment.

8 Claims, 3 Drawing Sheets

US 7,693,505 B2

SIGNAL DETECTOR

BACKGROUND OF INVENTION

1. Field of the Invention

The present invention relates to a signal detector and more particularly, to a signal detector, which alters its conditions of detection depending on the diversity of the environment.

2. Description of Related Art

In these days, various kinds of high technology products, such as cell phones, digital cameras, and pagers, have become essential in our daily lives. Following the advancement of technology, those high-tech products become smaller and more compact, but new problems have consequently developed.

For example, the cell phone nowadays can display both numerals and characters. With Internet service, a cell phone is able to have transnational and confidential communication, such as on-line chatting, which is hard to trace. If it is put to use in a crime, the investigation will encounter difficulties arising from the telecommunications aspects. Another example of the high-tech product is the pinhole camera, which is designed to be easily hidden and evil people take advantage of that feature. That is, many people's personal lives have been taped for sale or blackmail, which causes a sense of paranoia in the society. The foregoing high-tech products both have to rely on the transmission of signals to obtain information. Therefore, any illegal acts committed by using cell phones and pinhole cameras can be traced by detecting signals therefrom. However, prior art signal detectors are not able to automatically adapt to the environment and thus lack versatility.

SUMMARY OF THE INVENTION

The present invention relates to a signal detector that comprises: a radio frequency receiver which takes an external radio frequency signal; a wave filter which enables the external radio frequency signal to pass therethrough; a signal amplifier which receives the filtered radio frequency signal and outputs the signal after the process of signal amplification; a direct-conversion receiver which obtains the amplified radio frequency and transforms the radio frequency signal to a baseband signal; a data converter which comprises a background-noise filter, a reference-noise generator, and a level comparator, wherein the background-noise filter receives the signal of voltage or electric current which corresponds to the baseband signal and after the received signal passes through the background-noise filter, which is triggered by a reference-noise value of the reference-noise generator. The filtered signal is outputted to the level comparator and compared with a pre-determined value; if the level of the filtered signal is bigger than the pre-determined value, the level comparator will output a warning signal; a memory device which stores the pre-determined level value of the level comparator; and a microprocessor which receives the warning signal, wherein the microprocessor outputs an instruction to the reference-noise generator, which enables the reference-noise generator to generate a distinct reference-noise value according to diversity of the detected background-noise; furthermore, when the microprocessor receives the warning signal, the warning device will be switched on. Therefore, the present invention can detect whether a transmission of signal is present within a search area; if a signal is present, the warning device is able to detect the presence of signal transmission; moreover, the detecting conditions of the background-noise filter are adjusted to the diversity of the detecting environments. As a result, the signal detector will efficiently and correctly locate the presence of a signal transmission.

Additionally, the present invention comprises a protocol comparator that has a protocol database, which receives the filtered signal and outputs a protocol confirmation signal after the filtered signal goes through the protocol comparison; wherein, the microprocessor obtains the external protocol of the radio frequency signal according to the protocol confirmation signal. Furthermore, the present invention comprises a display device which can show the protocol of the detected signal, so the user can clearly know the detected type of the signal.

The present invention includes at least one signal connection port which connects to an external control device that controls the instruction of the reference-noise generator outputted by the microprocessor. Therefore, the signal detector of the present invention can automatically change its detective conditions depending on the environments, which substantially improves the convenience in usage.

DETAILED DESCRIPTION OF THE PREFERRED EMBODIMENT

Figure 1:
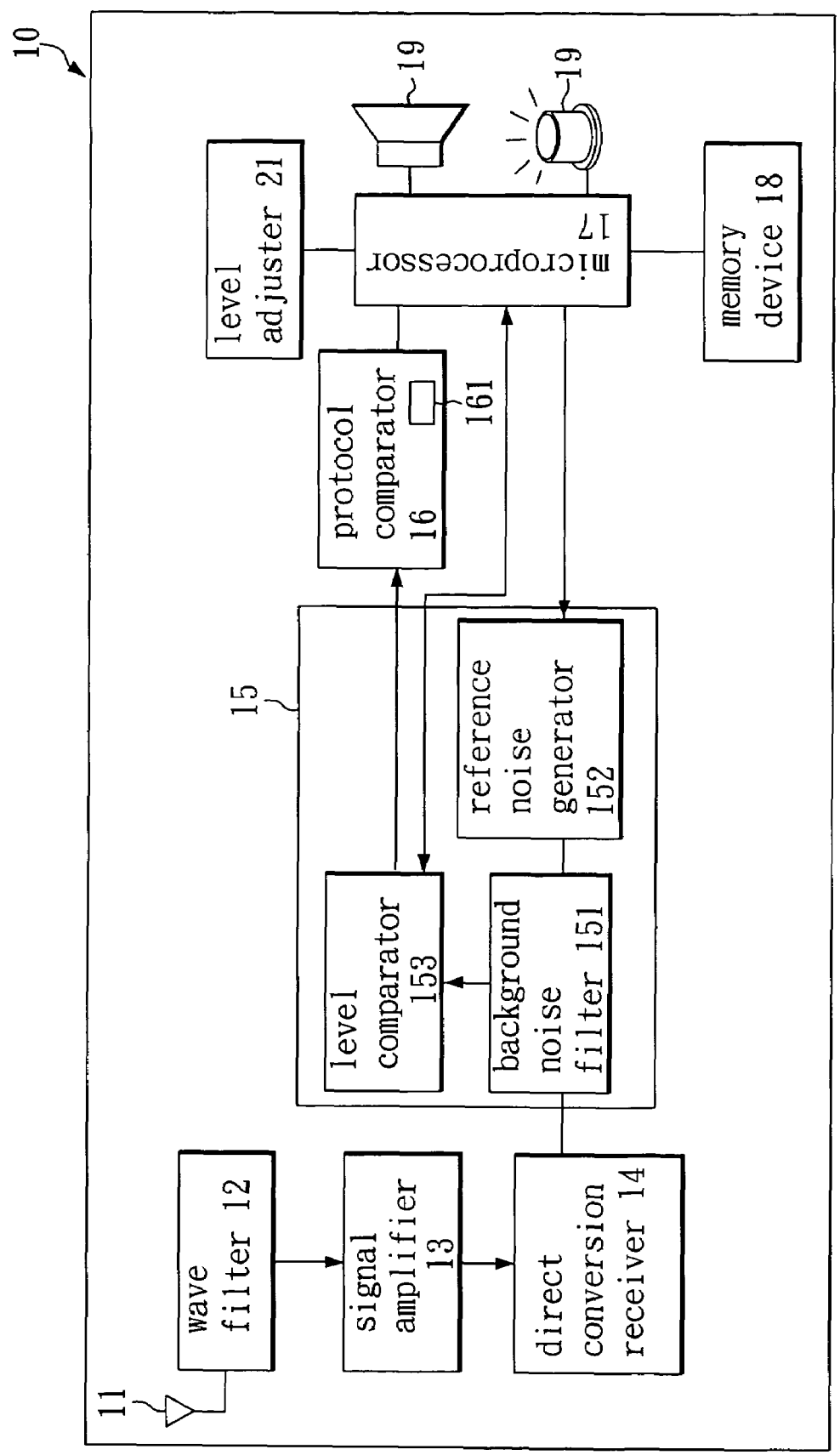
FIG. 1 is a functional diagram of the preferred embodiment of the present invention.

As shown in FIG. 1, a signal detector 10 of the present invention comprises a radio frequency receiver 11, a wave filter 12, a signal amplifier 13, a direct-conversion receiver 14, a data converter 15, a protocol comparator 16, a memory device 18, and a microprocessor 17. In this preferred embodiment, the radio frequency receiver 11 is used to receive external radio frequency signals, and the preferred frequency range is 30 MHz~6 GHz. When the radio frequency receiver 11 obtains an external radio frequency signal, the wave filter 12 will sift through the received radio frequency signal and output the filtered signal to the signal amplifier 13 to proceed with the signal amplification. At this time, the direct-conversion receiver 14 will directly transform the received signal to a baseband signal. Because the direct-conversion receiver 14 is a type of zero-IF receiver, the radio frequency signal can be directly converted to a baseband signal and does not need to go through the conversion by an IF circuit.

In this preferred embodiment, the data converter 15 comprises a background-noise filter 151, a reference-noise generator 152, and a level comparator 153. The background-noise filter 151 will receive the voltage value (Volt) or electric current value (mA) corresponding to the baseband signal which is outputted by the direct-conversion receiver 14. When the radio frequency signal is being transmitted, the corresponding voltage or electric current value can be obtained according to the intensity of the radio frequency signal, such as the voltage. Furthermore, the reference-noise value, such as 0.7 volt, outputted by the reference-noise generator 152 is filtered through the background-noise filter 151. A reference-noise value is produced when the microprocessor 17 sends an instruction to the reference-noise generator 152, and then the filtered signal is outputted to the level comparator 153. At this time, the level comparator 153 obtains a pre-determined level value through the microprocessor 17. The preferred memory device 18 is an EEPROM, which stores the pre-determined level value. Comparing the filtered signal with the pre-determined level value, if the level of the external radio frequency signal is bigger than the pre-determined level value, this indicates that the transmitting of an unusual signal is present in the detecting area, so the filtered signal is transferred to the protocol comparator 16 and microprocessor 17. In this present invention, the signal detector 10 comprises a level adjustor 21 connecting to the microprocessor 17, which can adjust the pre-determined level value (to increase or decrease). If the transmitting of an unusual signal is detected, the level adjustor 21 will increase its pre-determined level value in order to determine accurately the source of the signal transmitter; for example, in searching for the signal of a pinhole camera, if an unusual signal is detected, the pre-determined level value is increased gradually, and if the increased pre-determined level value is still smaller than the level of the external radio frequency signal, the signal detector is getting close to the source of signal transmitter and will be able to find the exact location of the signal emitter. The protocol comparator 16 comprises a protocol database 161, which is used for receiving filtered signals and proceeding to compare the signals with the protocol database 161. The protocol comparator 16 outputs a protocol confirmation signal to the microprocessor 17 to notify the microprocessor 17 of what kind the protocol the detected signal is, such as GSM, GPRS, or signals of transmitting images. Therefore, after the microprocessor 17 receives the protocol confirmation signal and the filtered signal, the kind of protocol of the detected radio frequency signal can be obtained according to the protocol confirmation signal. Then, the microprocessor 17 can output an instruction to the reference-noise generator 152 in accordance with the protocol obtained, in order to control the reference-noise generator 152 to produce difference reference-noise values depending on the radio frequency signal detected. As a result, the detecting conditions match better with the detected area. Additionally, the microprocessor 17 receives the filtered signal, which indicates the presence of transmitting signals is detected, and the warning device is triggered to notify the user. The warning device can be a device such as a buzzer or a light emitter diode (LED) for warning purpose.

Figure 2:
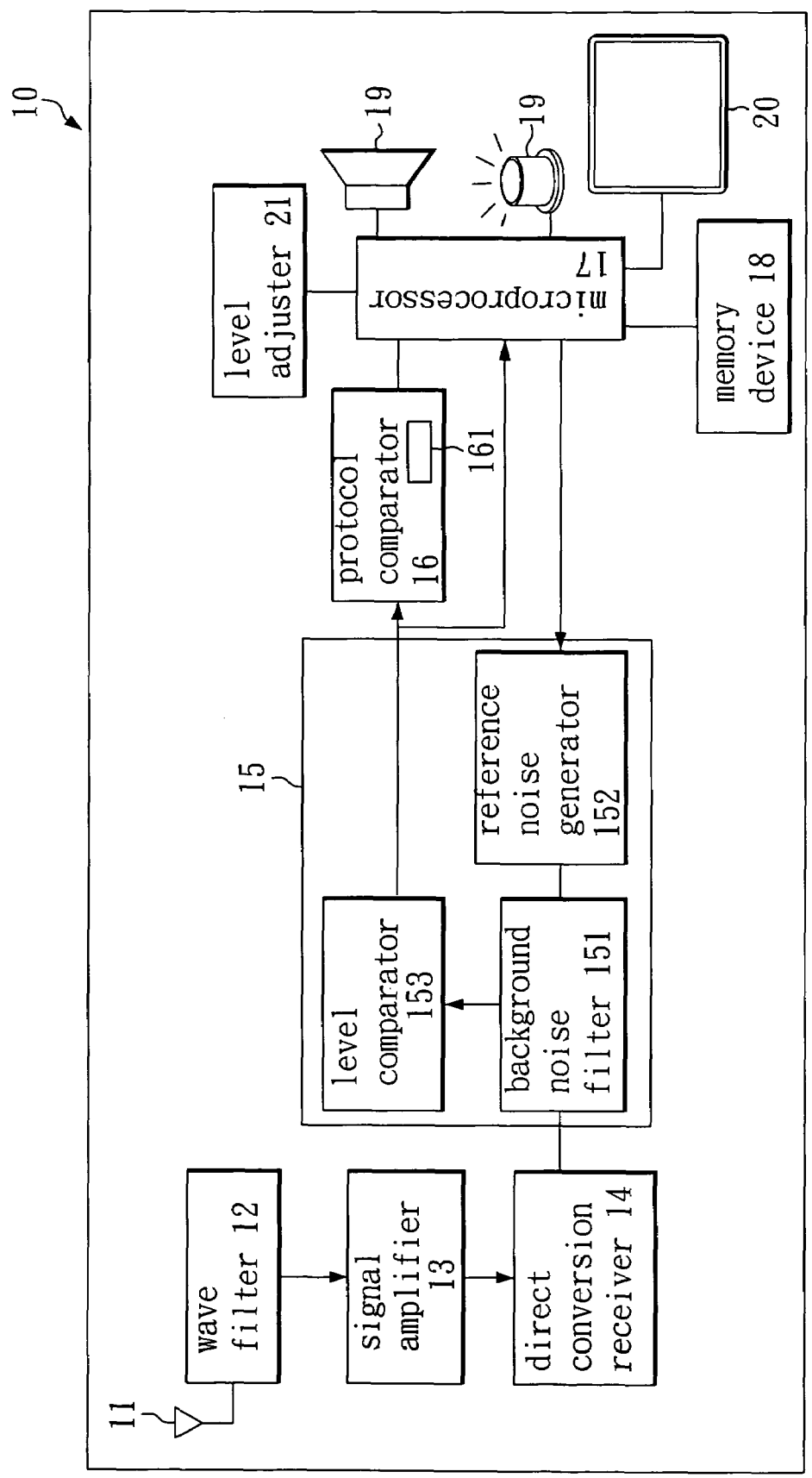
FIG. 2 is another functional diagram of the preferred embodiment of the present invention.

As shown in FIG. 2, the signal detector 10 comprises a display device 20, which shows the type of the radio frequency signal received by the radio frequency receiver 11. When the microprocessor 17 receives the protocol confirmation signal, the protocol of the received signal can be shown through the display device 20, so the user is able to know the type of protocol of detected signal. The preferred display device is an LCD device, but other LED displays having the same function can also be used.

Figure 3:
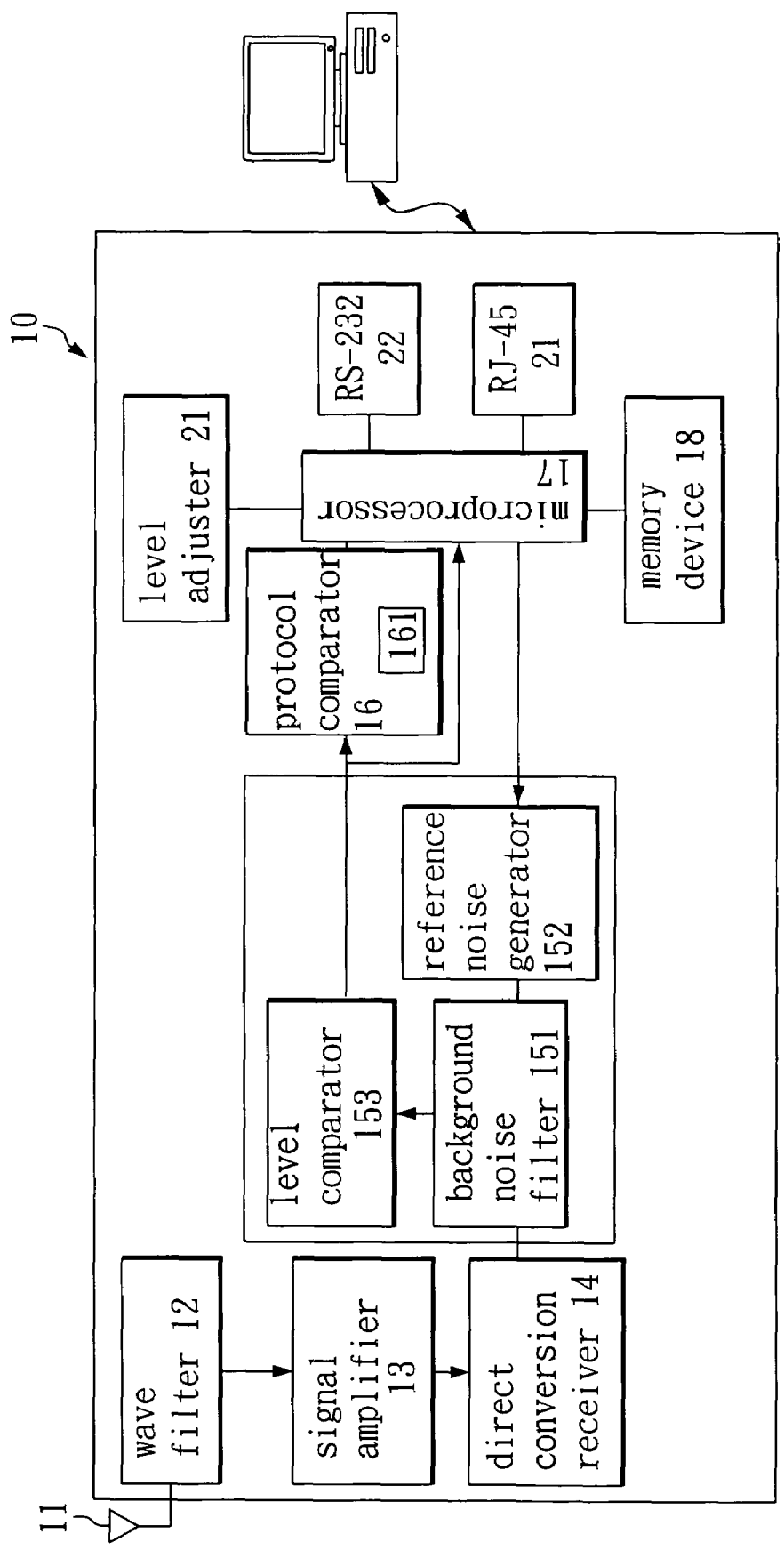
FIG. 3 is another functional diagram of the preferred embodiment of the present invention.

As shown in FIG. 3, the signal detector 10 comprises signal connection ports; for example, an RJ-45 connection port 21 or an RS-232 connection port 22, which connects to an external control device through wired or wireless network transfer, and the preferred device is a computer. A computer can be used to remotely control the microprocessor 17 of the signal detector 10 to output an instruction to the reference-noise generator 152, and input the pre-determined level value to the memory device 18.

As described above, the signal detector 10 can change its background-noise filtering conditions according to its detecting environments, which enables the signal detector 10 to be used under many different circumstances and not be influenced by variety of the detecting areas. Through the display device 20, the user can clearly know the protocol of the signal received. Furthermore, the user can use the computer to remotely control the signal detector 10 through the signal connection port, in order to improve its usability.

Although the present invention has been explained in relation to its preferred embodiment, it is to be understood that many other possible modifications and variations can be made without departing from the scope of the invention as hereinafter claimed.

What is claimed is:

1. A signal detector for locating the presence of a signal transmission and identifying the signal comprising:
   a radio frequency receiver, which receives an external radio frequency signal;
   a filter, which filters said radio frequency signal;
   a signal amplifier, which receives said filtered radio frequency signal and outputs said amplified signal;
   a direct-conversion-receiver, which receives said amplified radio frequency signal and transforms said amplified radio frequency signal directly to a baseband signal; a data converter, which comprises: a background-noise filter, a reference-noise value generator, and a level comparator; wherein, said background-noise filter receives the voltage or current signal corresponding to said baseband signal, and outputs a reference-noise value to be filtered; after passing through said background-noise filter, a signal is outputted to said level comparator and compared with a pre-determined level value, then if the level of said filtered signal is bigger than said pre-determined level value, said filtered signal is outputted;
   a memory device, which stores said pre-determined level values of said level comparator;
   a microprocessor, which receives said filtered signal, wherein said microprocessor outputs an instruction to said reference-noise-generator, so said reference-noise-generator can produce different reference-noise values depending on diverse background noises; furthermore, when said microprocessor receives said filtered signal, a warning device will be driven and switched on; and
   a protocol comparator that includes a protocol database; said protocol database receives said filtered signal and outputs a protocol confirmation signal to said microprocessor to notify what kind of protocol the confirmation signal is, including OSM, GPRS and signals of transmitting images, after proceeding with protocol comparison, wherein said microprocessor obtains a protocol of said external radio frequency signal according to said protocol confirmation signal,
   wherein said signal detector comprises a level adjuster connecting to said microprocessor to control said pre-determined level value of said level comparator in such a manner that, when said level comparator outputs said filtered signal due to the level of said filtered signal being bigger than said pre-determined level value, the level adjustor increases said pre-determined level value gradually and wherein the receiving range of said radio frequency receiver is 30 MHz to 6 GHz.

2. The signal detector as claimed in claim 1, further comprising a display device that shows a protocol of said external radio frequency signal.

3. The signal detector as claimed in claim 2, wherein said display device comprises an LCD display.

4. The signal detector as claimed in claim 1, wherein said signal detector comprises at least one connection port, which links to an external control device that controls said microprocessor to output said instruction and inputs a pre-determined level value to said memory device.

5. The signal detector as claimed in claim 4, wherein said connection port includes an RJ-45 connection port.

6. The signal detector as claimed in claim 4, wherein said connection port includes an RS-232 connection port.

7. The signal detector as claimed in claim 1, wherein said warning device is a buzzer.

8. The signal detector as claimed in claim 1, wherein said warning device is a light emitting diode.

* * * * *